United States Patent [19]

Suzuki

[11] Patent Number: 4,587,807
[45] Date of Patent: May 13, 1986

[54] APPARATUS FOR TOTALLY RECYCLING ENGINE EXHAUST GAS

[76] Inventor: Nagatoshi Suzuki, 5-5-7, Kugahara, Ota-ku, Tokyo, Japan

[21] Appl. No.: 486,188

[22] Filed: Apr. 18, 1983

[51] Int. Cl.$^4$ .......................... F02M 25/06; F01N 3/02
[52] U.S. Cl. .......................................... 60/274; 60/275; 60/278; 60/279; 123/536; 204/173; 204/177
[58] Field of Search ................ 60/275, 278, 279, 274; 123/568, 3, DIG. 12, 536; 204/164, 170, 174, 177, 173

[56] References Cited

U.S. PATENT DOCUMENTS

| | | | |
|---|---|---|---|
| 1,756,897 | 4/1930 | Bilsky | 60/275 |
| 1,905,627 | 4/1933 | Holland | 123/DIG. 12 |
| 2,572,851 | 10/1951 | Gardner | 204/173 |
| 3,035,561 | 5/1962 | Siegler | 60/278 |
| 3,409,403 | 11/1968 | Bjornson | 204/173 |
| 3,526,081 | 9/1970 | Kusters | 60/275 |
| 3,562,127 | 2/1971 | Wooton | 204/173 |
| 3,786,635 | 1/1974 | Kates | 60/278 |
| 3,841,824 | 10/1974 | Bethel | 60/275 |
| 4,345,572 | 8/1982 | Suzuki | 123/568 |

FOREIGN PATENT DOCUMENTS 96308  7/1980  Japan ..................... 123/536

OTHER PUBLICATIONS

Ali, M., Bradley, D., and Gupta, M. L., "The Effects of Coronas Upon the Later Stages of Gaseous Combustion", 7th International Conference on Gas Discharge and Their Applications, Sep. 3, 1982, University of Leeds, U.K.

English language translation of pertinent portions of Fundamental Power Coating, Dr. Emery P. Miller and Dr. David D. Taft, Chapter IV, Powder Coating by Static Electricity, (pp. 27–29).

Primary Examiner—Douglas Hart
Attorney, Agent, or Firm—Ronald P. Kananen

[57] ABSTRACT

A device designed to use exhaust gas discharged out of an engine combustion chamber by dissociating chemical substances contained in the exhaust gas such as CO, $CO_2$, NOx, HC, etc., in an exhaust gas molecule dissociating tube and drawing components of the exhaust gas, oxygen in particular, again into the engine combustion chamber. The device is so constructed as to collect dust including the carbon component of the exhaust gas in a cyclone drum for removal from the exhaust gas, which allows all of the engine exhaust to be recycled without releasing it in the atmosphere. The device is utilizable with various engines, e.g., gasoline engines, diesel engines and so on, and well-suited to mass production on account of its simple, compact and lightweight construction.

14 Claims, 1 Drawing Figure

U.S. Patent    May 13, 1986    4,587,807
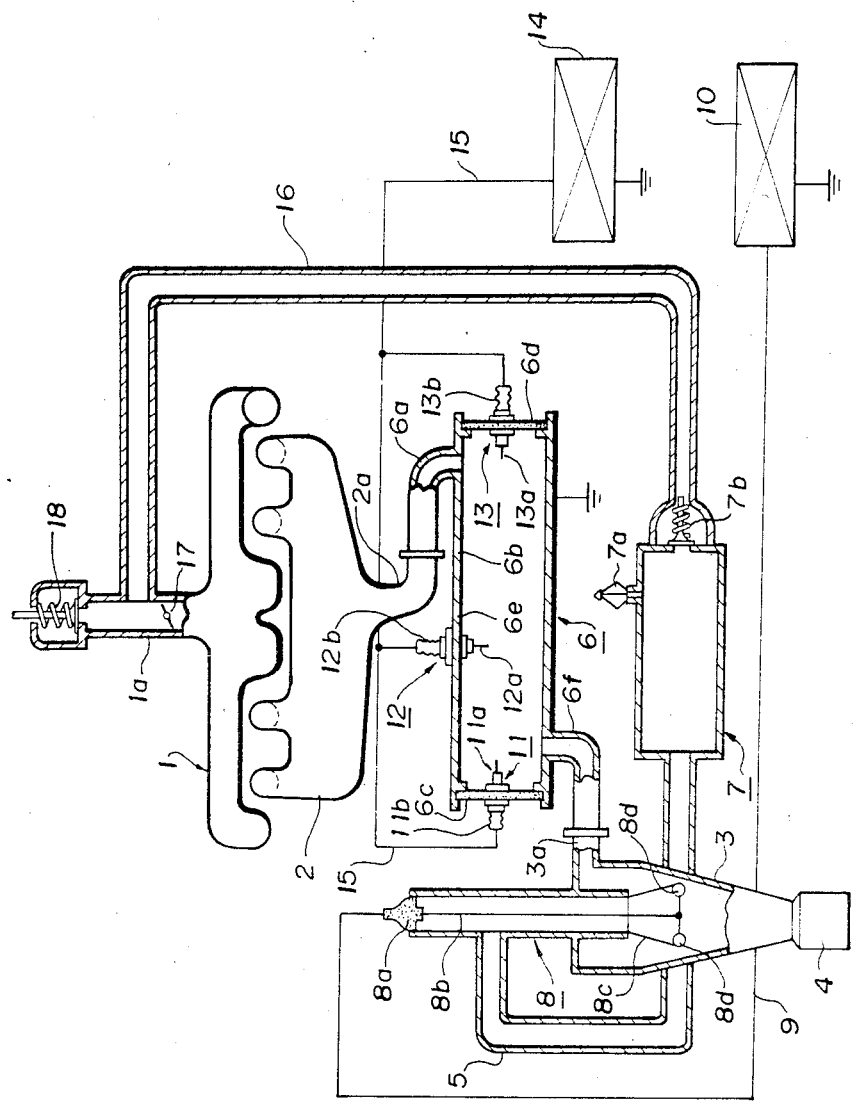

APPARATUS FOR TOTALLY RECYCLING ENGINE EXHAUST GAS

BACKGROUND OF THE INVENTION

The present invention relates to devices for recycling engine exhaust gas to reduce noxious exhaust emissions. The exhaust gas discharged out of various engines, e.g., gasoline and diesel automobile engines, can be fed into an exhaust gas molecule dissociating tube for separating the chemical substances contained in the exhaust gas into molecules. If the exhaust gas is also fed through an electrostatic filter for dedusting, the purified and dissociated exhaust gas can be returned to the combustion chamber of the engine without discharging the exhaust gas outside. This makes the maximum use of the oxygen produced by decomposing oxygen compounds contained in the exhaust gas which releases oxygen ions.

So far, total recycling of engine exhaust gas has not been available. Exhaust gas discharged from conventional automobile engines is often released into the atmosphere, as it is through a conventional muffler. In some devices a mixture of dedusted exhaust and clear air has been drawn into the engine to increase the combustion efficiency of the engine and thereby release an exhaust gas containing fewer noxious substances into the atmosphere, as shown in U.S. Pat. Nos. 3,035,561 and 4,326,862, but these achieve only partial recycling.

There has also been a so-called engine exhaust gas recirculation system which sucks up and recirculates a part of the exhaust gas back to the engine through a detector regulator valve requiring an intricate detecting device for the purpose of decreasing nitrogen oxides ($NO_x$) contained in the exhaust gas.

These prior art devices have all been such that exhaust gas is released in the atmosphere. Even emission control devices equipped with an electrostatic filter have encountered difficulty in purifying the exhaust gas, and they release exhaust gases containing noxious substances into the atmosphere. Thus, unless more than an electrostatic filter is provided and more than partial recycling is achieved, an exhaust gas containing a considerable amount of noxious substances will be released into the atmosphere. Furthermore, if the engine exhaust gas recirculating system requires a special detector/regulator valve, that raises the price of the system, naturally, and even then because a part of exhaust gas is still released in the atmosphere, the problems of environmental pollution including the air pollution, emission of carcinogenic substances, etc. remain unsolved.

The present invention has been made to overcome the disadvantages inherent in the above-mentioned prior art devices. The present invention provides a novel device for totally recycling engine exhaust gas, wherein exhaust gas discharged out of the engine is dedusted by means of an electrostatic filter and also dissociated into monomolecules, e.g., oxygen and carbon, and refed into the engine to avoid release of noxious material into the atmosphere, as well as to make the best use of the oxygen contained in the exhaust gas.

SUMMARY OF THE INVENTION

It is an object of the present invention to provide total recycling of engine exhaust gas by feeding the exhaust gas discharged from an engine into an exhaust gas molecule dissociating tube to separate the gas into monomolecules such as oxygen and carbon and drawing the dissociated gas again into the engine combustion chamber without releasing any of the gas into the atmosphere. Apparatus in accordance with the present invention delivers exhaust gas discharged from an engine into the engine's combustion chamber after purifying the gas and dissociating the gas into molecules to prevent air pollution and save fuel.

It is another object of the present invention to provide a novel device for totally recycling engine exhaust gas that is applicable to various engines including a diesel engines, gasoline engines, etc.

It is, furthermore, an object of the present invention to provide a novel device for totally recycling engine exhaust gas that is helpful to settlement of the problems involved in environmental pollution since none of the noxious exhaust gas is given off into the atmosphere.

It is yet a further object of the present invention to provide a device for totally recycling engine exhaust gas that assures reasonable engine efficiency through use of a gas control reservoir and a fresh air intake valve which modify the flow of recycled gases.

The objects, novel features and advantages of this invention will be more clearly understood when the following detailed description of a preferred embodiment thereof is considered in conjunction with the attached drawing.

It is to be understood in particular that the accompanying drawing is not limitative of the present invention, but is only for the description and explanation of an embodiment the invention claimed.

BRIEF DESCRIPTION OF THE DRAWING

The drawing shows a preferred embodiment of a recycling means for engine exhaust gas in accordance with the present invention and is an overall block schematic diagram including an electric circuit.

DETAILED DESCRIPTION OF THE PREFERRED EMBODIMENT

Referring now to the drawing, recycling means for treating engine exhaust gas in accordance with the present invention is shown, wherein an intake manifold 1 on the engine sucks up exhaust gas that has been dissociated into monomolecules including oxygen and dedusted. An exhaust manifold 2 carries exhaust gas discharged from the engine. A discharge conduit 2a of said exhaust manifold 2 is connected to an intake conduit 6a of an exhaust gas molecule dissociating tube 6. A discharge conduit 6 of the aforesaid exhaust gas molecule dissociating tube 6 is connected to an intake conduit 3a of a cyclone drum 3. A dust sump 4 is fitted to the bottom of said cyclone drum 3. One end of a communication pipe 5 is joined to the upper end of a Cottrell electrostatic precipitator tube 8 installed above said cyclone drum 3 and the other end thereof is joined to a gas control reservoir 7.

A safety valve 7a is mounted on the dissociated gas control reservoir 7. When exhaust gas of more than a predetermined volume flows to the aforesaid control reservoir 7 or a critical overpressure condition arises for any reason, this safety valve releases said exhaust gas outside. A regulating valve 7b is mounted on the output side of the dissociated gas control reservoir 7. Regulating valve 7b controls the flow rate of exhaust gas coming to the control reservoir 7 after having been dissociated, to draw a proper volume of exhaust gas into the engine combustion chamber.

An insulator 8a is secured to the top end of the electrostatic precipitator tube 8 and a discharge wire 8b is attached through the insulator. This discharge wire 8b is connected to a high voltage generator 10 via a high-tension wire 9. A supporting member 8c is secured to the bottom end of the electrostatic precipitator tube 8 with a ball insulator 8d affixed to the support member 8c. The other end of said discharge wire 8b is connected to a supporting member 8c.

The foregoing exhaust gas molecule dissociating tube 6 comprises a cylindrical main body case 6b. On the front face of this cylindrical main body case 6b, a high-insulation quartz glass plate 6c and, similarly, at the back and upper faces of the main body case 6b, high-insulation quartz glass plates 6d and 6e, respectively, are affixed to the case 6b for closing said tube 6.

Items 11, 12 and 13 are corona plugs made, for example, of ceramic material. The plugs are fixed to the main body case 6b and pass through said high-insulation quartz glass plates 6c, 6e and 6d on the front, upper and back faces of the cylindrical main body case 6b. The corona plugs 11, 12 and 13 are fitted with needle-shaped electrodes 11a, 12a and 13a, respectively, protruding inward from the main body case 6b. Said corona plugs 11, 12 and 13 are formed to be integral with insulators 11b, 12b and 13b that are fitted to protrude outward from cylindrical main body case 6b. The needle-shaped electrodes 11a, 12a and 13a are connected to a high-tension wire 15 through said insulators 11b, 12b and 13b. The other end of said high-tension wire 15 is connected to a high-voltage generator 14 that provides voltages of 100 to 150 kilovolts and a current of 100 to 200 microamperes.

A dissociated gas induction tube 16 is joined to an inducing tube 1a of the foregoing intake manifold 1. The aforesaid electrostatic precipitator tube 8 works to adsorb very fine particles of dust contained in exhaust gas and at the same time the corona discharge produced inside said electrostatic precipitator tube 8 by applying high voltage to the discharge wire 8b also further decomposes the exhaust gas into ions.

A throttle valve 17 is fitted to the inducing tube 1a of the intake manifold 1 to control the volume of the exhaust gas drawn into the engine. A relief valve 18 is fitted to the upper portion of the inducing tube 1a. When exhaust gas pressure increases abruptly, this valve works to release a part of the exhaust gas. The relief valve also provides vacuum relief. By operating said relief valve 18 in cooperation with the regulating valve 7b of the dissociated gas control reservoir 7, the flow rate of exhaust gas recycled totally can be controlled to optimize engine performance in accordance with methods well-known in the art.

The operation of this embodiment of means for totally recycling engine exhaust gas in accordance with the invention is as follows. Exhaust gas produced by the engine is delivered to the exhaust gas molecule dissociating tube 6 via the exhaust manifold 2, the discharge conduit 2a and the intake conduit 6a. The exhaust gas drawn in contains various chemical substances, e.g., CO, $CO_2$, $NO_x$ and $H_xC_x$. Voltage of 100 to 150 kilovolts is applied to the needle-shaped electrodes 11a, 12a and 13a of the corona plugs 11, 12 and 13 from the high voltage generator 14 through the high-tension wire 15. The corona discharge from said needle-shaped electrodes 11a, 12a and 13a, causes the molecules of the exhaust gas to dissociate. It has been shown that the temperature of exhaust gas then is 600° C. to 1000° C.

CO and $CO_2$ gases are thus separated into carbon molecules and oxygen moelcules and similarly, $H_xC_x$ compounds are separated into hydrogen molecules and carbon molecules, respectively.

The oxygen molecules thus dissociated are refed into the combustion chamber of the engine to burn the combustion chamber fuel gases. However, the dissociated exhaust gas is first fed into the cyclone drum 3 via the discharge conduit 6f. As the exhaust gas whirls inside the cyclone drum 3, dust which includes the carbon particles produced by dissociation drops into the dust sump 4. The dedusted exhaust gas then flows into the communication pipe 5. Also, a high voltage of 8 to 10 kilovolts is applied to the discharge wire 8b of the precipitator tube 8 from the high voltage generator 14 through the high-tension wire 9, thereby capturing dust particles and causing them to precipitate, as is well-known in the art.

The dissociated exhaust gas is drawn into the intake manifold 1 through the communication pipe 5, the dissociated gas control reservoir 7, the dissociated gas induction pipe 16, the inducing tube 1a and the throttle valve 17 of the intake manifold 1 to make the exhaust gas fulfill its function as the air for combustion. Reservation of exhaust gas and regulation of the flow rate of the exhaust gas into the engine are accomplished by controlling the foregoing regulating valve 7b properly, as described above.

Repetition of the action set forth above permits the exhaust gas discharged out of the engine to be totally recycled, thereby virtually eliminating the release of exhaust gas into the atmosphere.

The exhaust gas recycling means of the present invention provides the following advantages by virtue of the construction and action of the preferred embodiment described above:

Dissociated, dedusted exhaust gases are refed into the engine combustion chamber thus allowing the exhaust gases to be used effectively for combustion by removing carbon dust, and virtually eliminating the pollution of the air by noxious exhaust emissions from the engine. Furthermore, since the oxygen compounds contained in exhaust gas undergo ionic decomposition because of the corona discharge, the exhaust gas can be recycled directly thereby allowing highly compact construction.

What is more, the device of the present invention saves the necessity of installing an exhaust gas cooler, thus making it possible to form a device that has a lightweight, compact, simplifed construction and therefore is well-suited to mass production.

What is claimed is:

1. A device comprising:
means for recycling substantially all of the oxygen in an exhaust gas from a combustion chamber to provide under predetermined conditions the only source of oxygen to the intake of said combustion chamber, said recycling means comprising an exhaust gas molecule dissociating tube joined to the discharge conduit of an exhaust manifold for dissociating said exhaust gas by corona processing into components including monomolecules of oxygen from the constituents in said exhaust gas, a cyclone drum connected to the outlet side of said exhaust gas molecule dissociating tube and fitted with an electrostatic precipitator tube for removing dust from said exhaust gas, a dissociated gas control reservoir joined to said electrostatic precipitator tube for controlling the flow rate of exhaust gas, an an intake manifold connected to the outlet side of said dissociated gas control reservoir through an induction tube for recycling said dissociated exhaust gas to said combustion chamber to provide the source of oxygen to the intake of said combustion chamber.

2. A device for recycling engine exhaust gas as claimed in claim 1 wherein said exhaust gas molecule dissociating tube has a substantially cylindrical main body case and a predetermined number of corona plugs each fitted with a needle-shaped electrode, said plugs being installed on said case at a predetermined position to dissociate exhaust gas into monomolecules.

3. A device for recycling engine exhaust gas as claimed in claim 1 or claim 2 wherein a throttle valve is attached to the intake tube of said intake manifold with a dissociated gas control reservoir for making up shortages of air occurring when starting the engine whereby the intake pressure of exhaust gas is regulated.

4. A device for recycling engine exhaust gas as claimed in claim 1, claim 2, or claim 3 further comprising a regulated valve on the outlet side of said dissociated gas control reservoir whereby the flow rate of exhaust gas is regulated.

5. An apparatus comprising:
means for recycling dissociated and purified exhaust gas to provide substantially all of the oxygen from the exhaust gas for use as the only source of oxygen to the intake of an engine without discharging said exhaust gas to the atmosphere under predetermined conditions, for combustion with fuel in an engine having an intake manifold and an exhaust manifold, said recycling means comprising:
an electrostatic precipitator connected to the exhaust manifold of the engine;
a dissociation chamber connected to said electrostatic precipitator and to the intake manifold of the engine and including a dissociated gas control reservoir connected to said dissociation chamber and to the engine intake manifold; and
a cyclone drum connected to said electrostatic precipitator for removing particles from the exhaust gases in said electrostatic precipitator.

6. An apparatus as claimed in claim 5, said apparatus further comprising means for controlling the flow rate of said exhaust gases.

7. An apparatus as claimed in claim 5, said apparatus further comprising overpressure relief means for controlling the pressure of the exhaust gases input into the engine.

8. An apparatus as claimed in claim 5 wherein the exhaust gas flows into said electrostatic precipitator after leaving said dissociation chamber.

9. A method of burning fuel in the combustion chamber of an engine using an apparatus of the type which comprises an electrostatic precipitator connected to the exhaust manifold of the engine; a dissociation chamber connected to said electrostatic precipitator and to the intake manifold of the engine and including a dissociated gas control reservoir connected to said dissociation chamber and to the engine intake manifold; and a cyclone drum connected to said electrostatic precipitator for removing particles from the exhaust gases in said electrostatic precipitator, said method comprising the steps of:
dissociating the molecules of the exhaust gas from the engine in said dissociation chamber into monomolecules by subjecting said exhaust gas to the effects of a corona discharge in said dissociation chamber;
removing carbon and other particulate matter from the exhaust in said electrostatic precipitator and cyclone drum to dedust the exhaust gas; and
igniting a mixture of fuel and the dedusted exhaust gas in the combustion chamber of the engine, whereby fuel is initially oxidized solely by an oxygen component of the dissociated exhaust gas.

10. An apparatus for use in connection with a combustion chamber which produces an exhaust gas, said apparatus comprising:
means for dissociating substantially all of the gaseous components of exhaust gas into gaseous components which include molecular oxygen by subjecting said exhaust gas to the effects of a corona discharge; and
means for recycling the dissociated gaseous components of said exhaust gas to said combustion chamber without discharging said exhaust gas or said dissociated components into the atmosphere under predetermined flow and pressure conditions, said recycling means providing said molecular oxygen to the intake of said combustion chamber for use as virtually the sole source of recycled oxygen at the intake of said combustion chamber.

11. The apparatus as set forth in claim 10, further including means for purifying said exhaust gas by removing particulate matter therefrom prior to recirculation.

12. The apparatus as set forth in either claim 10 or 11, wherein said dissociating means includes an exhaust gas molecule dissociating tube having an intake connected to an exhaust of said combustion chamber and a discharge communicating with an intake of said combustion chamber.

13. The apparatus as set forth in claim 12, wherein said purifying means includes a cyclone drum having an intake connected to the exhaust of said dissociation tube.

14. The apparatus as set forth in claim 12, wherein said dissociating tube includes therein means for causing a corona discharge with said tube for effecting a dissociation molecules of said exhaust.

* * * * *